(12) United States Patent
Yamashita

(10) Patent No.: US 10,507,967 B2
(45) Date of Patent: Dec. 17, 2019

(54) VACUUM INSULATING CONTAINER

(71) Applicant: TOYOTA JIDOSHA KABUSHIKI KAISHA, Toyota-shi (JP)

(72) Inventor: Osamu Yamashita, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 66 days.

(21) Appl. No.: 15/813,301

(22) Filed: Nov. 15, 2017

(65) Prior Publication Data
US 2018/0178967 A1    Jun. 28, 2018

(30) Foreign Application Priority Data

Dec. 22, 2016 (JP) .................. 2016-249923

(51) Int. Cl.
| | | |
|---|---|---|
| *B65D 81/38* | (2006.01) | |
| *A47J 41/00* | (2006.01) | |
| *A47J 41/02* | (2006.01) | |
| *F16L 59/075* | (2006.01) | |
| *F17C 3/08* | (2006.01) | |

(52) U.S. Cl.
CPC ...... *B65D 81/3806* (2013.01); *A47J 41/0072* (2013.01); *A47J 41/022* (2013.01); *B65D 81/3837* (2013.01); *B65D 81/3841* (2013.01); *B65D 81/3869* (2013.01); *F16L 59/075* (2013.01); *F17C 3/08* (2013.01)

(58) Field of Classification Search
CPC ...... B65D 81/00–3869; B65D 81/3837; B65D 81/3841; A47J 41/00–022; A47J 41/0072; F17C 3/08; F16L 59/075

USPC .................................................. 220/592.27
See application file for complete search history.

(56) References Cited

U.S. PATENT DOCUMENTS

| | | | | |
|---|---|---|---|---|
| 1,218,036 A | * | 3/1917 | Altenberg | A47J 41/02 |
| | | | | 215/12.1 |
| 1,517,978 A | * | 12/1924 | Giese | B65D 81/3841 |
| | | | | 220/23.91 |
| 2,147,263 A | * | 2/1939 | Mills | B65D 7/22 |
| | | | | 220/366.1 |
| 3,258,147 A | * | 6/1966 | Rownd | A47J 41/02 |
| | | | | 215/12.1 |

(Continued)

FOREIGN PATENT DOCUMENTS

| | | |
|---|---|---|
| FR | 7.416 E | 7/1907 |
| JP | 2011-219125 | 11/2011 |

(Continued)

*Primary Examiner* — Kareen K Thomas
(74) *Attorney, Agent, or Firm* — Oblon, McClelland, Maier & Neustadt, L.L.P.

(57) ABSTRACT

In a vacuum insulating container, an outer cylinder has a first annular wall that extends radially inward so as to be inclined with respect to an aperture plane of the outer cylinder at an open end of the outer cylinder and has a tip end part spaced apart from an outer peripheral surface of the inner cylinder; an inner cylinder has a second annular wall that extends radially outward so as to be inclined with respect to the aperture plane of the inner cylinder at an open end of the inner cylinder and faces the first annular wall; and an annular sealing member formed of an elastic body having a low thermal conductivity is compressed between the first annular wall and the second annular wall.

3 Claims, 8 Drawing Sheets

(56) References Cited

U.S. PATENT DOCUMENTS

| | | | | |
|---|---|---|---|---|
| 3,813,757 | A * | 6/1974 | Bell | A47J 41/024 |
| | | | | 29/455.1 |
| 5,775,526 | A * | 7/1998 | Overy | A47J 31/50 |
| | | | | 215/12.1 |
| 6,332,557 | B1 * | 12/2001 | Moran | A47J 41/0083 |
| | | | | 215/12.1 |
| 6,505,752 | B1 * | 1/2003 | Rolfes | A47J 41/0016 |
| | | | | 215/13.1 |
| 2014/0166654 | A1 * | 6/2014 | Lane | A47G 19/2272 |
| | | | | 220/262 |
| 2018/0135757 | A1 | 5/2018 | Yamashita | |
| 2018/0141740 | A1 | 5/2018 | Yamashita | |

FOREIGN PATENT DOCUMENTS

| | | |
|---|---|---|
| JP | 2018-76953 A | 5/2018 |
| JP | 2018-79972 A | 5/2018 |
| JP | 2018-121825 A | 8/2018 |

\* cited by examiner

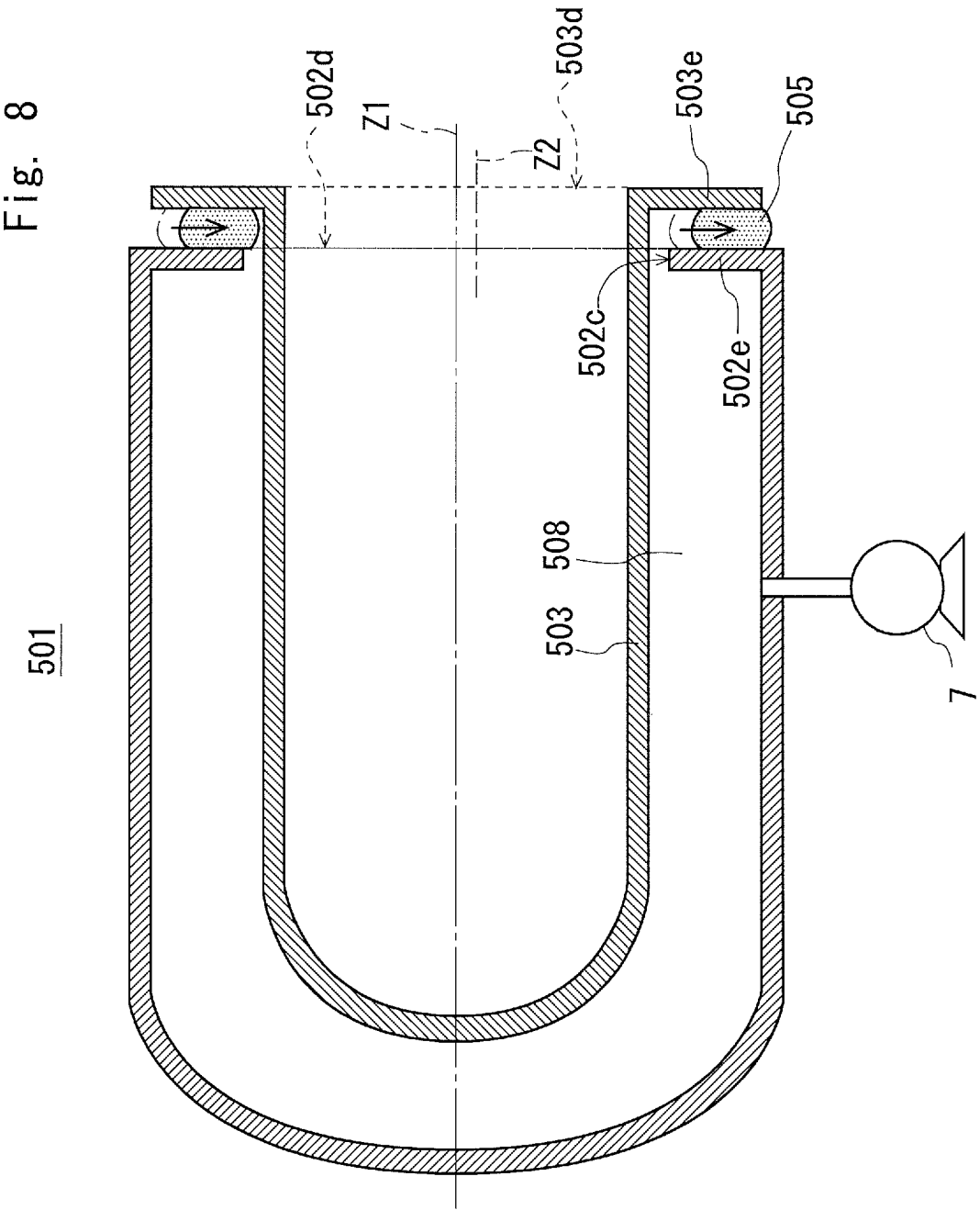

VACUUM INSULATING CONTAINER

CROSS REFERENCE TO RELATED APPLICATIONS

This application is based upon and claims the benefit of priority from Japanese patent application No. 2016-249923, filed on Dec. 22, 2016, the disclosure of which is incorporated herein in its entirety by reference.

BACKGROUND

The present disclosure relates to a vacuum insulating container.

A vacuum insulating container is known in which an inner cylinder having a bottom is disposed in an outer cylinder which also has a bottom, and a vacuum space is formed between the inner cylinder and the outer cylinder. Japanese Unexamined Patent Application Publication No. 2011-219125 discloses the vacuum insulating container in which an inner cylinder, which is made of metal, is integrally formed with an outer cylinder, which is also made of metal, at an opening.

SUMMARY

In the vacuum insulating container disclosed in Japanese Unexamined Patent Application Publication No. 2011-219125, when the inner cylinder and the outer cylinder are integrally formed at an opening, heat from the inner cylinder is transmitted to the outer cylinder, which causes a problem that thermal insulation properties of the vacuum insulating container are insufficient.

To solve this problem, the inner cylinder and the outer cylinder can be separated from each other and the space between the inner cylinder and the outer cylinder can be sealed with a sealing member. FIG. 7 is a schematic view for explaining a structure of a vacuum insulating container 501 currently being developed. As shown in FIG. 7, the vacuum insulating container 501 includes an outer cylinder 502 having a bottom, and an inner cylinder 503 having a bottom and disposed in the outer cylinder 502. The inner cylinder 503 is disposed with respect to the outer cylinder 502 in such a manner that an aperture plane 503d of the inner cylinder 503 is located outside of an aperture plane 502d of the outer cylinder 502.

The outer cylinder 502 is provided with a first annular wall 502e which extends inward along the aperture plane 502d of the outer cylinder 502 and has a tip end part 502c that is spaced apart from the outer peripheral surface of the inner cylinder 503. The inner cylinder 503 is provided with a second annular wall 503e which extends outward along the aperture plane 503d of the inner cylinder 503 and faces the first annular wall 502e. To seal the space between the outer cylinder 502 and the inner cylinder 503, an annular sealing member 505, which is formed of an elastic body having a low thermal conductivity, is compressed between the first annular wall 502e and the second annular wall 503e.

The space between the outer cylinder 502 and the inner cylinder 503 is vacuumed by a vacuum pump 7. In manufacturing of the vacuum insulating container 501 currently being developed, before the space between the outer cylinder 502 and the inner cylinder 503 is vacuumed, the central axes of the outer cylinder 502, the sealing member 505, and the inner cylinder 503 are caused to match an axis Z1.

FIG. 8 is a schematic view for explaining a problem that is caused when the space between the outer cylinder 502 and the inner cylinder 503 is vacuumed in manufacturing of the vacuum insulation container 501 currently being developed. As shown in FIG. 8, even when the outer cylinder 502, the sealing member 505, and the inner cylinder 503 are disposed in such a manner that the central axes thereof match the axis Z1 before vacuuming, the position of the sealing member 505 is moved during vacuuming, so that the central axis of the sealing member 505 may deviate from the axis Z1 to an axis Z2. This is because there is a small distribution of frictional forces received by the sealing member 505 from the contact surface between the sealing member 505 and each of the first annular wall 502e and the second annular wall 503e, which causes the sealing member 505 to be moved in a direction in which the frictional force is relatively small during vacuuming. In the vacuum insulating container 501, when the central axis of the sealing member 505 greatly deviates from the central axes of the outer cylinder 502 and the inner cylinder 503, there is a possibility that a predetermined heat insulation property cannot be obtained.

The present disclosure has been made in view of the above-mentioned circumstances, and an object of the present disclosure is to provide a vacuum insulating container capable of preventing a position of a sealing member from being moved from a predetermined position due to vacuuming when a space between an outer cylinder and an inner cylinder is sealed with the sealing member.

The present disclosure provides a vacuum insulating container including: an outer cylinder having a bottom; and an inner cylinder having a bottom and disposed in the outer cylinder, a vacuum space being formed between the outer cylinder and the inner cylinder. The inner cylinder is disposed with respect to the outer cylinder in such a manner that an aperture plane of the inner cylinder is located outside of an aperture plane of the outer cylinder. The outer cylinder is provided with a first annular wall that extends radially inward so as to be inclined with respect to the aperture plane of the outer cylinder at an open end of the outer cylinder and has a tip end part spaced apart from an outer peripheral surface of the inner cylinder. The inner cylinder is provided with a second annular wall that extends radially outward so as to be inclined with respect to the aperture plane of the inner cylinder at an open end of the inner cylinder and faces the first annular wall. The vacuum insulating container further includes an annular sealing member formed of an elastic body having a thermal conductivity lower than that of the outer cylinder and the inner cylinder, the annular sealing member being compressed between the first annular wall and the second annular wall to seal the vacuum space.

The first annular wall of the outer cylinder extends radially inward so as to be inclined with respect to the aperture plane of the outer cylinder at the open end of the outer cylinder. The second annular wall of the inner cylinder extends radially outward so as to be inclined with respect to the aperture plane of the inner cylinder at the open end of the inner cylinder, and faces the first annular wall. When the first annular wall and the second annular wall are formed in a tapered shape, the sealing member sandwiched between the first annular wall and the second annular wall is most stable in a state where the central axis of the sealing member is located at a position where the central axis of the sealing member matches the central axis of the outer cylinder and the central axis of the inner cylinder. Accordingly, the sealing member located at a stable position where the central axes of the outer cylinder, the sealing member, and the inner cylinder match each other is hardly moved and is less likely to be affected by a small distribution of frictional forces received from the contact surface between the sealing member and each of the first annular wall and the second annular wall. Thus, when the space between the outer cylinder and the inner cylinder is vacuumed in the state where the central axes of the outer cylinder, the sealing member, and the inner cylinder match each other, the position of the sealing member can be prevented from being moved from a predetermined position.

Further, the second annular wall is formed so as to be parallel to the first annular wall.

When the second annular wall is formed so as to be parallel to the first annular wall, the sealing member can be more evenly compressed by the first annular wall and the second annular wall.

Further, the sealing member is provided with a surface that faces the first annular wall and is parallel to the first annular wall, and a surface that faces the second annular wall and is parallel to the second annular wall.

The sealing member is provided with the surface that faces the first annular wall and is parallel to the first annular wall, and the surface that faces the second annular wall and is parallel to the second annular wall. This structure facilitates positioning of the central axes of the outer cylinder, the sealing member, and the inner cylinder when the inner cylinder is inserted into the outer cylinder in manufacturing of the vacuum insulating container.

According to the present disclosure, it is possible to prevent a position of a sealing member from being moved from a predetermined position due to vacuuming when a space between an outer cylinder and an inner cylinder is sealed with the sealing member.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 8 is a schematic view for explaining a problem caused when a space between an outer cylinder and an inner cylinder is vacuumed in manufacturing of the vacuum insulating container currently being developed.

DESCRIPTION OF EMBODIMENTS

Figure 1:
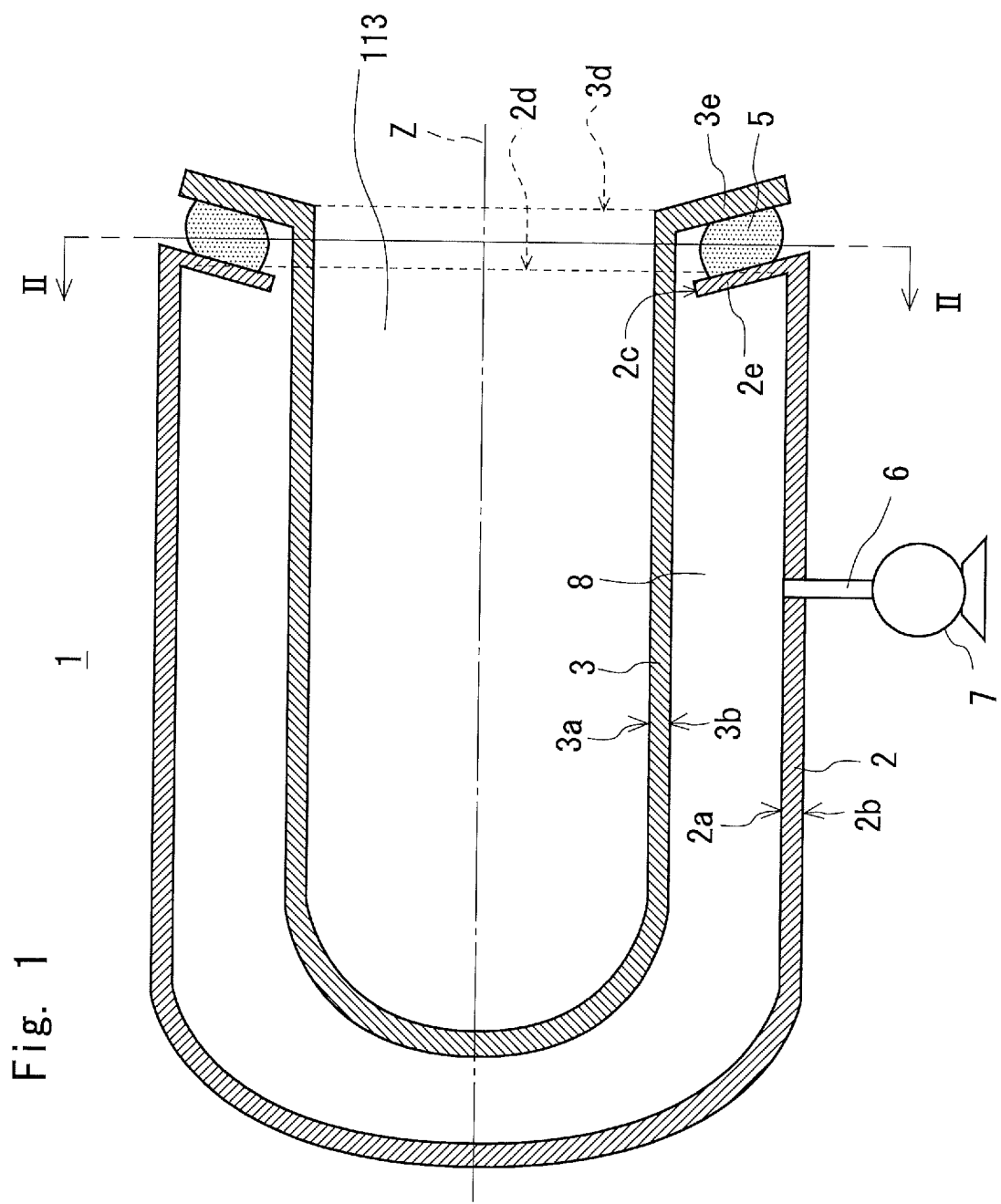
FIG. 1 is a schematic view showing a structure of a vacuum insulating container according to an embodiment.

Embodiments of the present disclosure will be described below with reference to the drawings. The following description and the drawings are abbreviated and simplified as appropriate for clarity of explanation. In the drawings, the same elements are denoted by the same reference numerals, and repeated descriptions are omitted as needed.

First, a structure of an insulating container 1 according to this embodiment will be described with reference to FIGS. 1 and 2.

Figure 2:
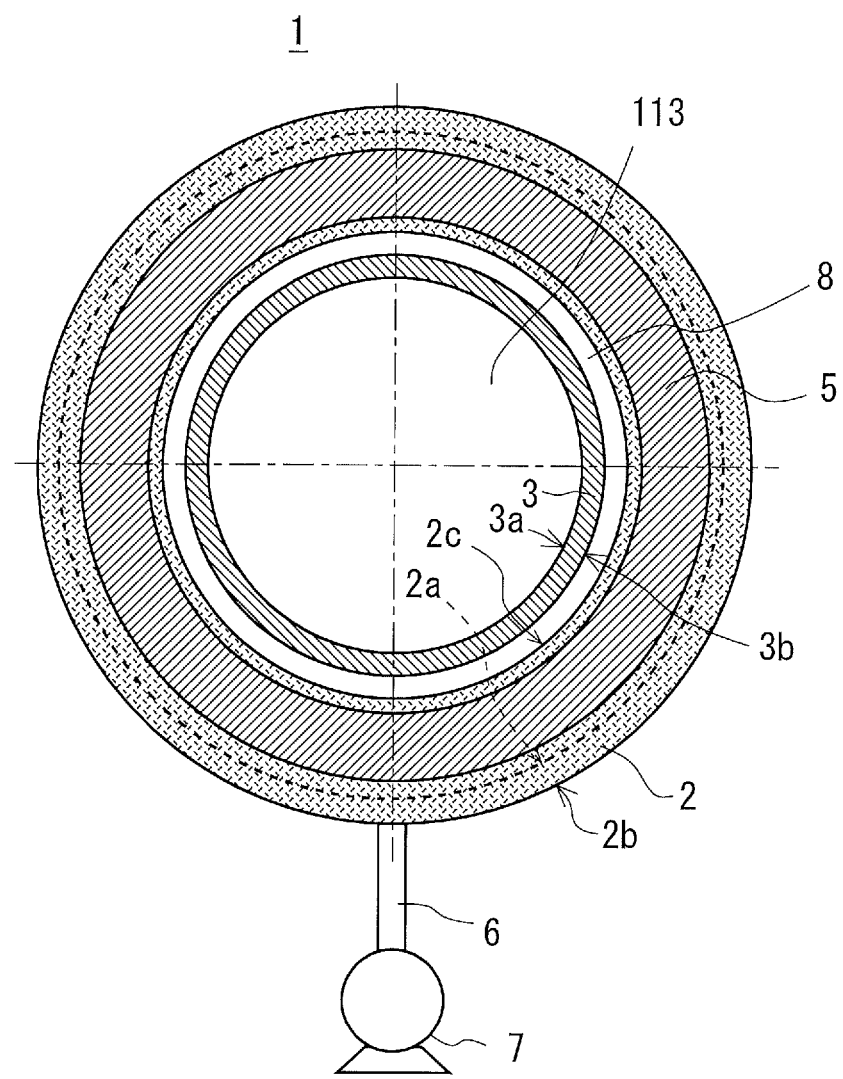
FIG. 2 is a sectional view taken along a line II-II shown in FIG. 1.

FIG. 1 is a schematic view showing the structure of the vacuum insulating container 1. FIG. 2 is a sectional view taken along a line II-II shown in FIG. 1. As shown in FIGS. 1 and 2, the vacuum insulating container 1 includes an outer cylinder 2 having a bottom, and an inner cylinder 3 which is disposed in the outer cylinder 2 and has a bottom. The inner cylinder 3 is disposed with respect to the outer cylinder 2 in such a manner that an aperture plane $3d$ of the inner cylinder 3 is located outside of an aperture plane $2d$ of the outer cylinder 2.

A material for the outer cylinder 2 and the inner cylinder 3 is, for example, stainless steel or steel. The outer cylinder 2 is provided with a first annular wall $2e$ that extends radially inward so as to be inclined with respect to the aperture plane $2d$ of the outer cylinder 2 at an open end of the outer cylinder 2 and has a tip end part $2c$ that is spaced apart from the outer peripheral surface $3b$ of the inner cylinder 3. The inner cylinder 3 is provided with a second annular wall $3e$ that extends radially outward so as to be inclined with respect to the aperture plane $3d$ of the inner cylinder 3 at an open end of the inner cylinder 3 and faces the first annular wall $2e$.

The first annular wall $2e$ is formed so as to be tapered toward the bottom of the outer cylinder 2 along an axis Z, and the second annular wall $3e$ is formed so as to be tapered toward the bottom of the inner cylinder 3 along the axis Z. When the second annular wall $3e$ is formed so as to be parallel to the first annular wall $2e$, preferably, the sealing member 5, which is described later, is more evenly compressed by the first annular wall $2e$ and the second annular wall $3e$.

The sealing member 5 has an annular shape and is formed of an elastic body which has a thermal conductivity lower than that of the outer cylinder 2 and the inner cylinder 3. As the sealing member 5, for example, an O-ring formed of a silicon resin or fluororesin can be used. The sealing member 5 is compressed between the first annular wall $2e$ and the second annular wall $3e$, to thereby seal the space between the outer cylinder 2 and the inner cylinder 3. In this state, air is evacuated from the sealed space between the outer cylinder 2 and the inner cylinder 3 by the vacuum pump 7 through a port 6 which is provided on a side surface of the outer cylinder 2, so that a vacuum space 8 is formed between the outer cylinder 2 and the inner cylinder 3.

An outside of the outer cylinder 2 is outside air, and an accommodation space 113 within the inner cylinder 3 is a heated space. Specifically, an outer peripheral surface $2b$ of the outer cylinder 2 is in contact with the outside air, and an inner peripheral surface $3a$ of the inner cylinder 3 is in contact with the accommodation space 113 which is a heated space. The outer cylinder 2 and the inner cylinder 3 are in contact with each other via only the sealing member 5 which is formed of a material having a thermal conductivity lower than that of the outer cylinder 2 and the inner cylinder 3. An inner peripheral surface $2a$ of the outer cylinder 2 and an inner peripheral surface $3a$ of the inner cylinder 3 are in contact with the vacuum space 8. Accordingly, even when the inner cylinder 3 receives heat from the accommodation space 113, the transfer of the heat from the inner cylinder 3 to the outer cylinder 2 can be suppressed. The vacuum insulating container 1 has the structure as described above, thereby sufficiently enhancing the thermal insulation properties of the vacuum insulating container 1.

Figure 3:
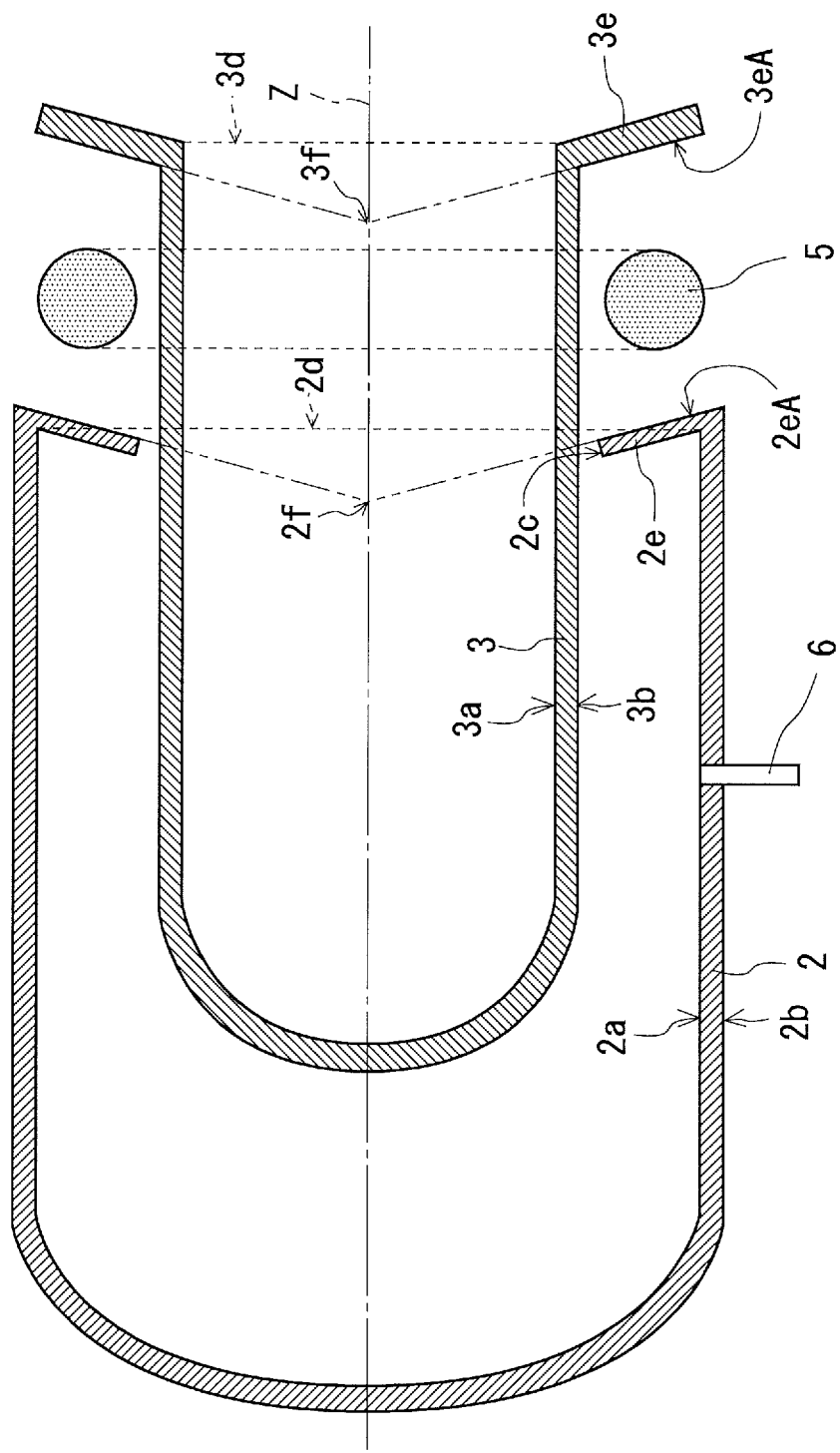
FIG. 3 is a schematic view for explaining a process of inserting an inner cylinder into an outer cylinder in manufacturing of a vacuum insulating container according to this embodiment.

FIG. 3 is a schematic view for explaining a process of inserting the inner cylinder 3 into the outer cylinder 2 in manufacturing of the vacuum insulating container 1. As shown in FIG. 3, in the process of inserting the inner cylinder 3 into the outer cylinder 2, the central axes of the outer cylinder 2, the sealing member 5, and the inner cylinder 3 match the axis Z. The sealing member 5 is sandwiched between the first annular wall of the outer cylinder 2 and the second annular wall of the inner cylinder 3, while the state where the central axes of the outer cylinder 2, the sealing member 5, and the inner cylinder 3 match each other is maintained.

As described above, the first annular wall 2e extends radially inward so as to be inclined with respect to the aperture plane 2d of the outer cylinder 2, and the second annular wall 3e extends radially outward so as to be inclined with respect to the aperture plane 3d of the inner cylinder 3. In this case, the first annular wall 2e is formed so as to be tapered toward the bottom of the outer cylinder 2 along the axis Z, and the second annular wall 3e is formed so as to be tapered toward the bottom of the inner cylinder 3 along the axis Z. Accordingly, as shown in FIG. 3, a vertex 2f of a cone extended toward the center of the container from the surface of the first annular wall 2e that is in contact with the sealing member 5, and a vertex 3f of a cone extended toward the center of the container from the surface of the second annular wall 3e that is in contact with the sealing member 5 are each located on the axis Z.

When the sealing member 5 is disposed between the first annular wall 2e and the second annular wall 3e, the sealing member 5 is most stable in a state where the sealing member 5 is located at a position where the central axis of the sealing member 5 matches the central axes of the outer cylinder 2 and the inner cylinder 3. Accordingly, the sealing member 5 located at a stable position where the central axes of the outer cylinder 2, the sealing member 5, and the inner cylinder 3 match each other is hardly moved and is less likely to be affected by a small distribution of frictional forces received from the contact surface between the sealing member 5 and each of the first annular wall 2e and the second annular wall 3e. Thus, when the space between the outer cylinder 2 and the inner cylinder 3 is vacuumed in the state where the central axes of the outer cylinder 2, the sealing member 5, and the inner cylinder 3 match each other, the position of the sealing member 5 can be prevented from being moved from a predetermined position.

When the second annular wall 3e is formed so as to be parallel to the first annular wall 2e, preferably, a sealing member 205 is more evenly compressed by the first annular wall 2e and the second annular wall 3e.

Modified Example 1

Figure 4:
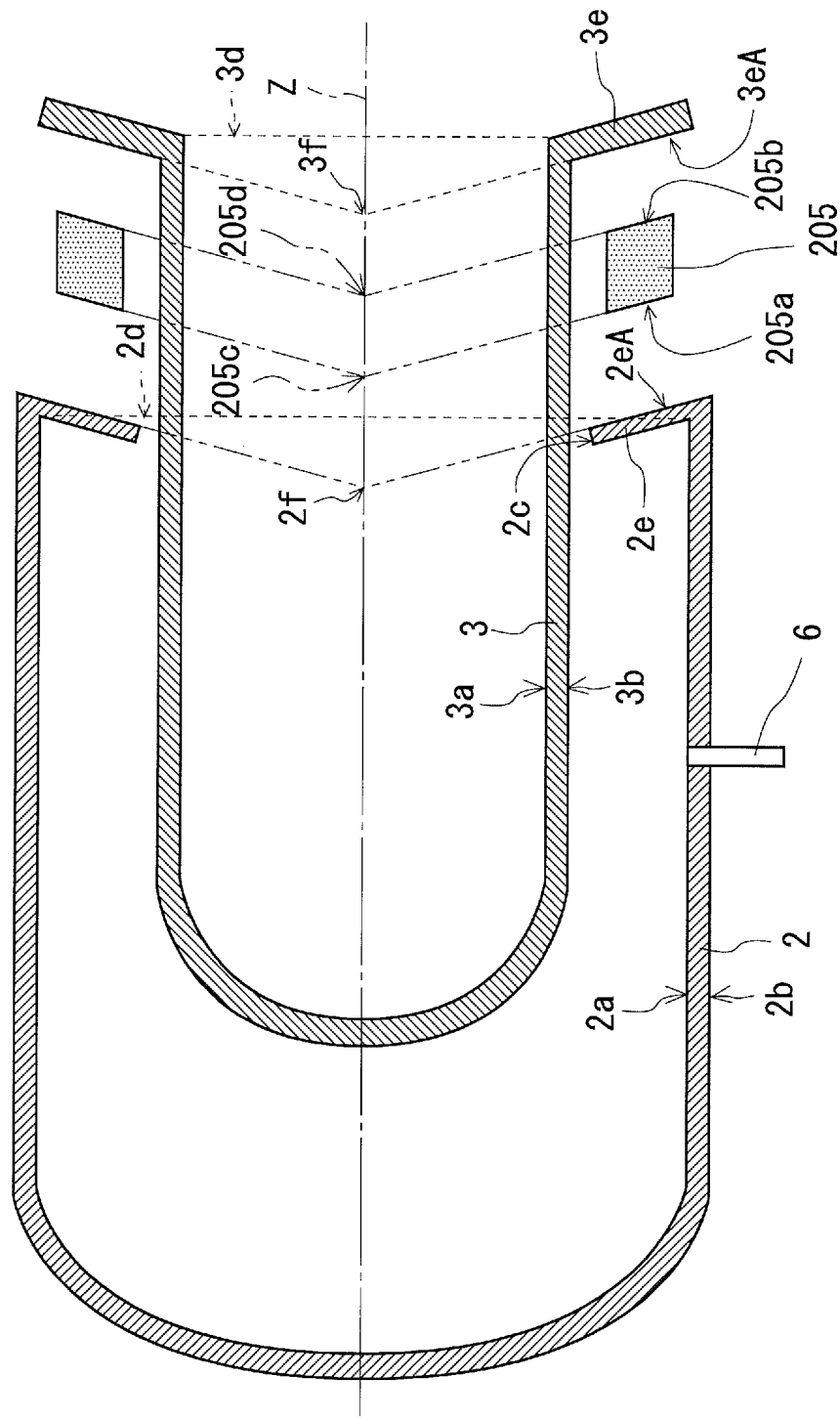
FIG. 4 is a schematic view showing a modified example of a sealing member according to Modified Example 1.

FIG. 4 is a schematic view showing the sealing member 205 according to Modified Example 1. As shown in FIG. 4, the sealing member 205 has a surface 205a that faces the first annular wall 2e and is parallel to the first annular wall 2e, and a surface 205b that faces the second annular wall 3e and is parallel to the second annular wall 3e.

As described above, the vertex 2f of the cone extended toward the center of the container from the surface of the first annular wall 2e that is in contact with the sealing member 5, and the vertex 3f of the cone extended toward the center of the container from the surface of the second annular wall 3e that is in contact with the sealing member 5 are each located on the axis Z. Further, a vertex 205c of a cone extended toward the center of the container from the surface 205a, and a vertex 205d of a cone extended toward the center of the container from the surface 205b are each located on the axis Z.

When the surface 205a is brought into surface contact with an opposing surface 2eA of the first annular wall 2e that faces the sealing member 205, the vertex 205c and the vertex 2f can be matched each other. Similarly, when the surface 205b of the sealing member 205 is brought into surface contact with an opposing surface 3eA of the second annular wall 3e that faces the sealing member 205, the vertex 205d and the vertex 3f can be matched each other. That is, the sealing member 205 has the surface 205a and the surface 205b, which facilitates positioning of the central axes of the outer cylinder 2, the sealing member 205, and the inner cylinder 3 when the inner cylinder 3 is inserted into the outer cylinder 2 in manufacturing of the vacuum insulating container 1.

Modified Example 2

Figure 5:
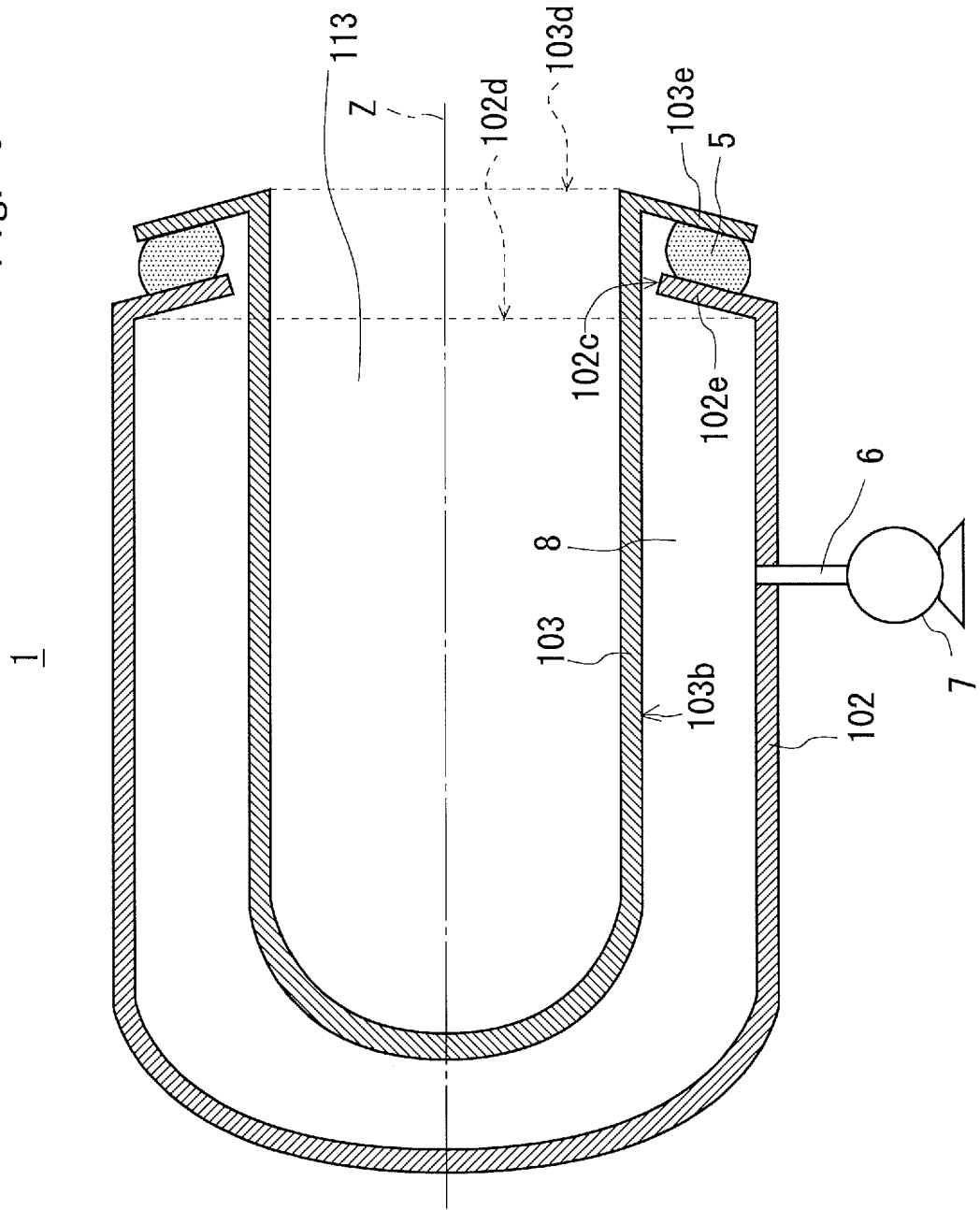
FIG. 5 is a schematic view showing an outer cylinder and an inner cylinder according to Modified Example 2.

FIG. 5 is a schematic view showing an outer cylinder 102 and an inner cylinder 103 according to Modified Example 2. As shown in FIG. 5, the outer cylinder 102 is provided with a first annular wall 102e that extends radially inward so as to be inclined with respect to an aperture plane 102d of the outer cylinder 102 at an open end of the outer cylinder 102 and has a tip end part 102c that is spaced apart from an outer peripheral surface 103b of the inner cylinder 103. The inner cylinder 103 is provided with a second annular wall 103e that extends radially outward so as to be inclined in the same direction as the first annular wall 102e with respect to the aperture plane 102d of the outer cylinder 102 at an open end of the inner cylinder 103 and faces the first annular wall 102e.

Unlike the first annular wall 2e of the outer cylinder 2 shown in FIG. 1, the first annular wall 102e is formed so as to be tapered toward the side opposite to the bottom of the outer cylinder 102 along the axis Z. Unlike the second annular wall 3e of the inner cylinder 3 shown in FIG. 1, the second annular wall 103e is formed so as to be tapered toward the side opposite to the bottom of the inner cylinder 103 along the axis Z.

When the sealing member 5 is disposed between the first annular wall 102e and the second annular wall 103e, the sealing member 5 is most stable in a state where the sealing member 5 is located at a position where the central axis of the sealing member 5 matches the central axes of the outer cylinder 102 and the inner cylinder 103. Accordingly, the sealing member 5 located at a stable position where the central axes of the outer cylinder 102, the sealing member 5, and the inner cylinder 103 match each other is hardly moved and is less likely to be affected by a small distribution of frictional forces received from the contact surface between the sealing member 5 and each of the first annular wall 102e and the second annular wall 103e. Thus, when the space between the outer cylinder 102 and the inner cylinder 103 is vacuumed in the state where the central axes of the outer cylinder 102, the sealing member 5, and the inner cylinder 103 match each other, the position of the sealing member 5 can be prevented from being moved from a predetermined position.

When the second annular wall 103e is formed so as to be parallel to the first annular wall 102e, preferably, the sealing member 5 is more evenly compressed by the first annular wall 102e and the second annular wall 103e.

Modified Example 3

Figure 6:
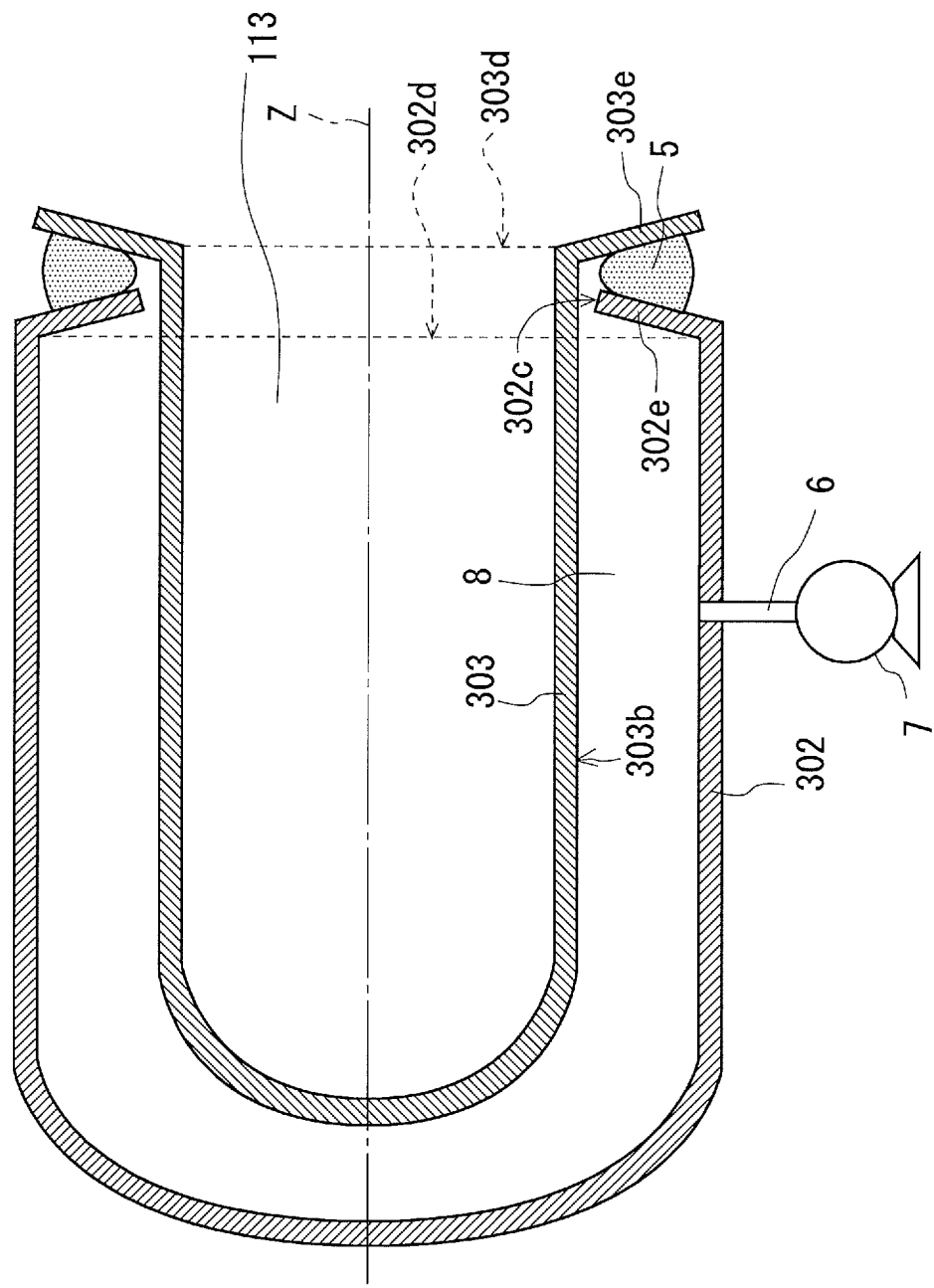
FIG. 6 is a schematic view showing an outer cylinder and an inner cylinder according to Modified Example 3.
Figure 7:
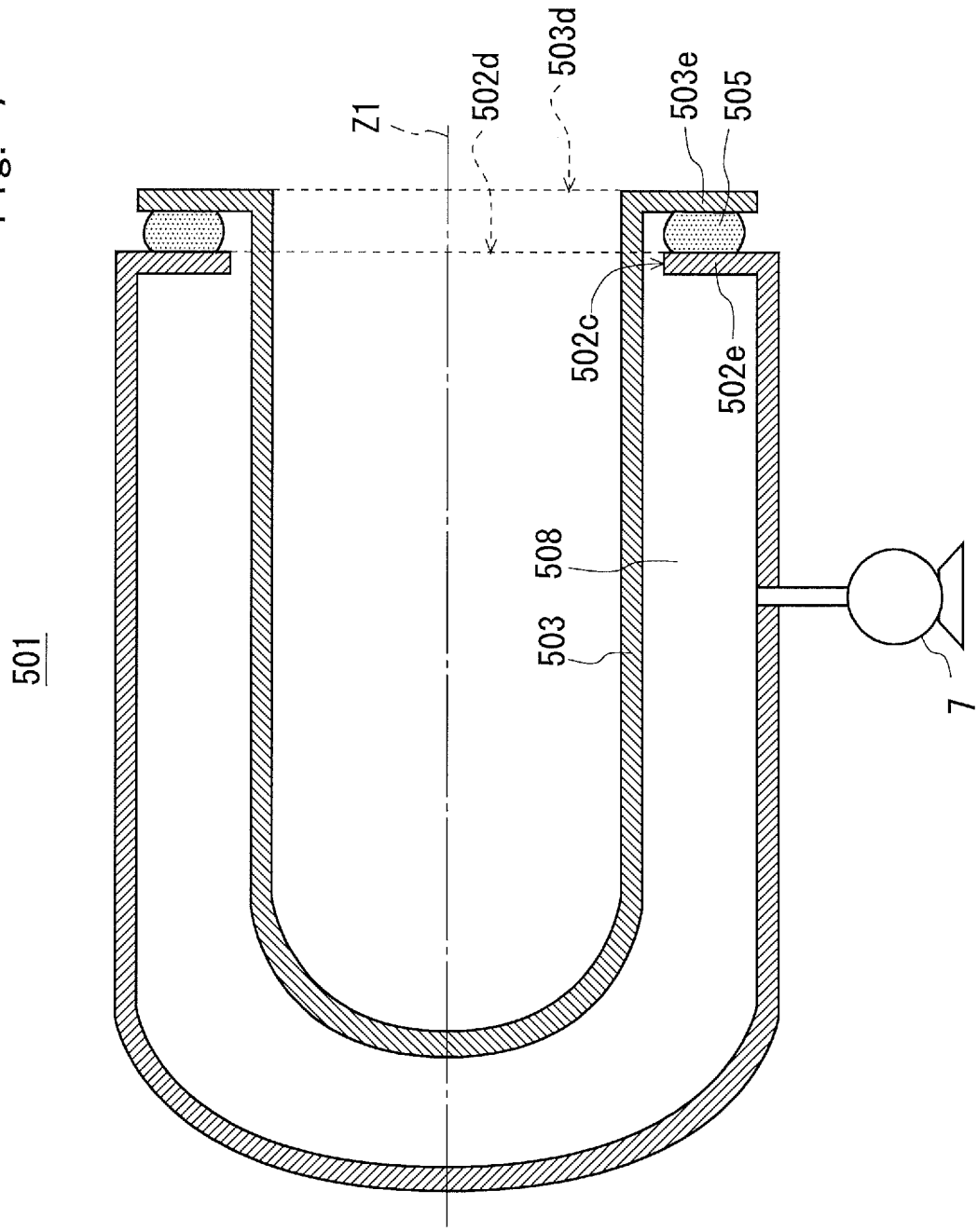
FIG. 7 is a schematic view for explaining a structure of a vacuum insulating container currently being developed.

FIG. 6 is a schematic view showing an outer cylinder 302 and an inner cylinder 303 according to Modified Example 3.

As shown in FIG. 6, the outer cylinder 302 has a first annular wall 302e that extends radially inward so as to be inclined with respect to the aperture plane 102d of the outer cylinder 302 at an open end of the outer cylinder 302 and has a tip end part 302c that is spaced apart from the outer peripheral surface 303b of the inner cylinder 303. The inner cylinder 303 has a second annular wall 303e that extends radially outward so as to be inclined with respect to the aperture plane 302d of the inner cylinder 302 at an open end of the inner cylinder 103 and faces the first annular wall 302e.

Unlike the first annular wall 2e of the outer cylinder 2 shown in FIG. 1, the first annular wall 302e is formed so as to be tapered toward the side opposite to the bottom of the outer cylinder 302 along the axis Z. On the other hand, the second annular wall 303e is formed so as to be tapered toward the bottom of the inner cylinder 303 along the axis Z, like the second annular wall 3e of the inner cylinder 3 shown in FIG. 1.

When the sealing member 5 is disposed between the first annular wall 302e and the second annular wall 303e, the central axis of the sealing member 5 is most stable in a state where the central axis of the sealing member 5 matches the central axes of the outer cylinder 302 and the inner cylinder 303. Accordingly, the sealing member 5 located at a stable position where the central axes of the outer cylinder 302, the sealing member 5, and the inner cylinder 303 match each other is hardly moved and is less likely to be affected by a small distribution of frictional forces received from the contact surface between the sealing member 5 and each of the first annular wall 302e and the second annular wall 303e. Thus, when the space between the outer cylinder 302 and the inner cylinder 303 is vacuumed in the state where the central axes of the outer cylinder 302, the sealing member 5, and the inner cylinder 303 match each other, the position of the sealing member 5 can be prevented from being moved from a predetermined position.

Note that the present disclosure is not limited to the embodiments described above, and can be modified as appropriate without departing from the scope of the invention. For example, like in Modified Example 1, the sealing member having a surface that faces the first annular wall and is parallel to the first annular wall, and a surface that faces the second annular wall and is parallel to the second annular wall can be combined with the outer cylinder and the inner cylinder according to Modified Example 2, and with the outer cylinder and the inner cylinder according to Modified Example 3.

From the invention thus described, it will be obvious that the embodiments of the invention may be varied in many ways. Such variations are not to be regarded as a departure from the spirit and scope of the invention, and all such modifications as would be obvious to one killed in the art are intended for inclusion within the scope of the following claims.

What is claimed is:

1. A vacuum insulating container comprising:
an outer cylinder having a bottom; and
an inner cylinder having a bottom, the inner cylinder being disposed in the outer cylinder, and a vacuum space being formed between the outer cylinder and the inner cylinder, wherein
the inner cylinder is disposed with respect to the outer cylinder in such a manner that an aperture plane of the inner cylinder is located outside of an aperture plane of the outer cylinder,
the outer cylinder is provided with a first annular wall that extends radially inward so as to be inclined with respect to the aperture plane of the outer cylinder at an open end of the outer cylinder and has a tip end part spaced apart from an outer peripheral surface of the inner cylinder,
the inner cylinder is provided with a second annular wall that extends radially outward so as to be inclined with respect to the aperture plane of the inner cylinder at an open end of the inner cylinder and faces the first annular wall, and
the vacuum insulating container further comprises an annular sealing member formed of an elastic body having a thermal conductivity lower than that of the outer cylinder and the inner cylinder, the annular sealing member being compressed between the first annular wall and the second annular wall to seal the vacuum space.

2. The vacuum insulating container according to claim 1, wherein the second annular wall is formed so as to be parallel to the first annular wall.

3. The vacuum insulating container according to claim 1, wherein the sealing member is provided with a surface that faces the first annular wall and is parallel to the first annular wall, and a surface that faces the second annular wall and is parallel to the second annular wall.

* * * * *